(12) United States Patent
Oberg et al.

(10) Patent No.: US 8,755,257 B2
(45) Date of Patent: Jun. 17, 2014

(54) METHOD AND APPARATUS FOR DETECTING LAND PRE-PITS

(75) Inventors: Mats Oberg, Cupertino, CA (US); Jingfeng Liu, Longmont, CO (US)

(73) Assignee: Marvell World Trade Ltd., St. Michael (BB)

(*) Notice: Subject to any disclaimer, the term of this patent is extended or adjusted under 35 U.S.C. 154(b) by 0 days.

(21) Appl. No.: 13/439,464

(22) Filed: Apr. 4, 2012

(65) Prior Publication Data

US 2012/0213048 A1    Aug. 23, 2012

Related U.S. Application Data

(63) Continuation-in-part of application No. 12/249,248, filed on Oct. 10, 2008, now Pat. No. 8,164,993.

(60) Provisional application No. 61/472,135, filed on Apr. 5, 2011, provisional application No. 60/980,000, filed on Oct. 15, 2007.

(51) Int. Cl.
*G11B 7/00* (2006.01)

(52) U.S. Cl.
USPC .............. 369/47.27; 369/53.2; 369/124.15

(58) Field of Classification Search
USPC ................ 369/47.27, 53.2, 124.15
See application file for complete search history.

(56) References Cited

U.S. PATENT DOCUMENTS

| | | |
|---|---|---|
| 2002/0114249 A1 | 8/2002 | Kato et al. |
| 2002/0167888 A1 | 11/2002 | Kamioka et al. |
| 2003/0198164 A1* | 10/2003 | Eom .................... 369/53.34 |
| 2004/0136284 A1* | 7/2004 | Sano et al. ............ 369/47.17 |
| 2005/0007928 A1 | 1/2005 | Iimura |
| 2005/0047318 A1 | 3/2005 | Sakata |
| 2005/0047759 A1 | 3/2005 | Sakata |
| 2005/0122884 A1 | 6/2005 | Hagiwara |
| 2005/0174913 A1 | 8/2005 | Shih et al. |
| 2007/0047400 A1 | 3/2007 | Haddad et al. |
| 2008/0130437 A1 | 6/2008 | Kanenaga et al. |

FOREIGN PATENT DOCUMENTS

| | | |
|---|---|---|
| EP | 1 443 501 A2 | 8/2004 |
| EP | 1 443 501 A3 | 8/2004 |
| WO | WO 2004/090877 A1 | 10/2004 |
| WO | WO 2009/051657 A1 | 4/2009 |

OTHER PUBLICATIONS

International Search Report and Written Opinion of International Searching Authority, mailed Jul. 19, 2012 in counterpart International Application No. PCT/US2012/032152.

* cited by examiner

*Primary Examiner* — Latanya Bibbins

(57) ABSTRACT

Aspects of the disclosure provide a method for detecting land pre-pits. The method includes detecting, based on a land pre-pit threshold, a land pre-pit data stream from a signal responsive to land pre-pits on an optical medium, comparing a characteristic of the detected land pre-pit data stream in a specific number of wobble periods with a pre-determined land pre-pit characteristic in the specific number of wobble periods, and adjusting the land pre-pit threshold based on the comparison.

20 Claims, 14 Drawing Sheets

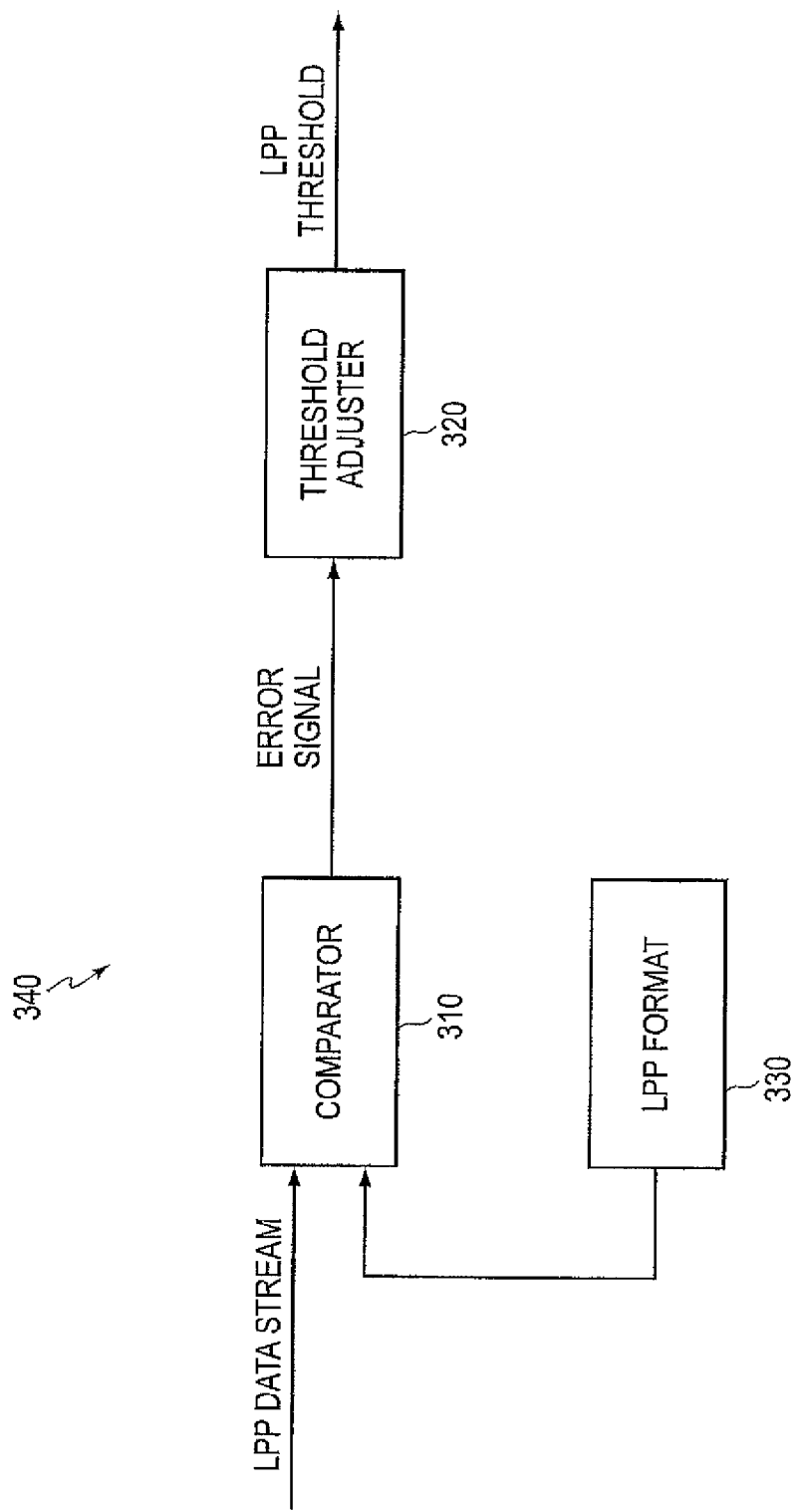

| | $b_2$ | $b_1$ | $b_0$ |
|---|---|---|---|
| PRE-PIT SYNC CODE IN EVEN POSITION | 1 | 1 | 1 |
| PRE-PIT SYNC CODE IN ODD POSITION | 1 | 1 | 0 |
| PRE-PIT DATA SET TO ONE | 1 | 0 | 1 |
| PRE-PIT DATA SET TO ZERO | 1 | 0 | 0 |

| WOBBLE PERIOD INDEX | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| EVEN SYNC | 1 | 1 | 1 | 0 | 0 | 0 | 0 | 0 | 0 | 0 | 0 | 0 | 0 | 0 | 0 | 0 |
| ODD SYNC | 0 | 0 | 0 | 0 | 0 | 0 | 0 | 0 | 1 | 1 | 0 | 0 | 0 | 0 | 0 | 0 |
| EVEN ONE | 1 | 0 | 1 | 0 | 0 | 0 | 0 | 0 | 0 | 0 | 0 | 0 | 0 | 0 | 0 | 0 |
| ODD ONE | 0 | 0 | 0 | 0 | 0 | 0 | 0 | 0 | 1 | 0 | 1 | 0 | 0 | 0 | 0 | 0 |
| EVEN ZERO | 1 | 0 | 0 | 0 | 0 | 0 | 0 | 0 | 0 | 0 | 0 | 0 | 0 | 0 | 0 | 0 |
| ODD ZERO | 0 | 0 | 0 | 0 | 0 | 0 | 0 | 0 | 1 | 0 | 0 | 0 | 0 | 0 | 0 | 0 |

Indices 0–7: EVEN-NUMBER FRAME; Indices 8–15: ODD-NUMBER FRAME.

METHOD AND APPARATUS FOR DETECTING LAND PRE-PITS

INCORPORATION BY REFERENCE

This present disclosure claims the benefit of U.S. Provisional Application No. 61/472,135, "Acquisition Circuit for LPP Threshold Adaptation," filed on Apr. 5, 2011, and is a continuation-in-part of U.S. patent application Ser. No. 12/249,248, "Method and Apparatus for Detecting Land Pre-Pits," filed on Oct. 10, 2008, which in turn claims the benefit of U.S. Provisional Application No. 60/980,000, "Land Pre-Pit Detector with Adaptive Threshold," filed on Oct. 15, 2007. The entire disclosures of the above-identified applications are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Land pre-pits can be used to embed information, such as address information, disk information, for memory media, such as DVD-R, DVD-RAM, DVD-RW, and the like. For example, a memory medium may include a spiral groove with a spiral land. The spiral groove and the spiral land can be wobbled to incorporate timing information. Additionally, a memory medium, such as DVD-R, DVD-RAM and DVD-RW, may utilize land pre-pits, which can be in the form of little pieces of mirrors deposited at specific locations of the spiral land of the memory medium, to embed address information and disk information. The land pre-pits can be detected by a medium recording device to obtain the address information and the disk information of the memory medium. The address information and the disk information can assist the medium recording device to record user data at the specific address in the spiral groove of the memory medium.

SUMMARY

Aspects of the disclosure provide a method for detecting land pre-pits. The method includes detecting, based on a land pre-pit threshold, a land pre-pit data stream from a signal responsive to land pre-pits on an optical medium, comparing a characteristic of the detected land pre-pit data stream in a specific number of wobble periods with a pre-determined land pre-pit characteristic in the specific number of wobble periods, and adjusting the land pre-pit threshold based on the comparison.

To compare the characteristic of the detected land pre-pit data stream in the specific number of wobble periods with the pre-determined land pre-pit characteristic in the specific number of wobble periods, in an embodiment, the method includes comparing the characteristic of the detected land pre-pit data stream in a multiple of sixteen wobble periods with the pre-determined land pre-pit characteristic in the multiple of sixteen wobble periods.

According to an aspect of the disclosure, the method includes detecting the characteristic of the detected land pre-pit data stream in the specific number of wobble periods prior to detecting a sync code from the land pre-pit data stream.

In an example, the method includes counting a number of detected land pre-pits in the specific number of wobble periods. Further, the method includes comparing the number of detected land pre-pits in the specific number of wobble periods with an upper limit of land pre-pits in the specific number of wobble periods, and comparing the number of land pre-pits with a lower limit of land pre-pits in the specific number of wobble periods.

To adjust the land pre-pit threshold based on the comparison, the method includes adjusting the land pre-pit threshold in a direction to increase the number of detected land pre-pits when the number is below the lower limit, and adjusting the land pre-pit threshold in a direction to decrease the number of detected land pre-pits when the number is above the upper limit.

Aspects of the disclosure provide an apparatus. The apparatus includes a detector and a controller. The detector is configured to detect, based on a land pre-pit threshold, land pre-pit data stream from a signal responsive to land pre-pits on an optical medium. The controller is configured to compare a characteristic of the detected land pre-pit data stream in a specific number of wobble periods with a pre-determined characteristic in the specific number of wobble periods, and adjust the land pre-pit threshold based on the comparison.

Aspects of the disclosure provide an optical drive. The optical drive includes an optical pickup unit, a detector and a controller. The optical pickup unit is configured to generate a signal in response to a track on an optical medium. The detector is configured to detect, based on a land pre-pit threshold, land pre-pit data stream from the signal. The controller is configured to compare a characteristic of the detected land pre-pit data stream in a specific number of wobble periods with a pre-determined characteristic in the specific number of wobble periods, and adjust the land pre-pit threshold based on the comparison.

BRIEF DESCRIPTION OF THE DRAWINGS

Various embodiments of this disclosure that are proposed as examples will be described in detail with reference to the following figures, wherein like numerals reference like elements, and wherein:

FIG. 3 shows a block diagram of an exemplary land pre-pit loop controller;

FIGS. 4A and 4B show an exemplary land pre-pit data format;

FIG. 10 shows a table 1000 according to an embodiment of the disclosure.

DETAILED DESCRIPTION OF EMBODIMENTS

Figure 1A:
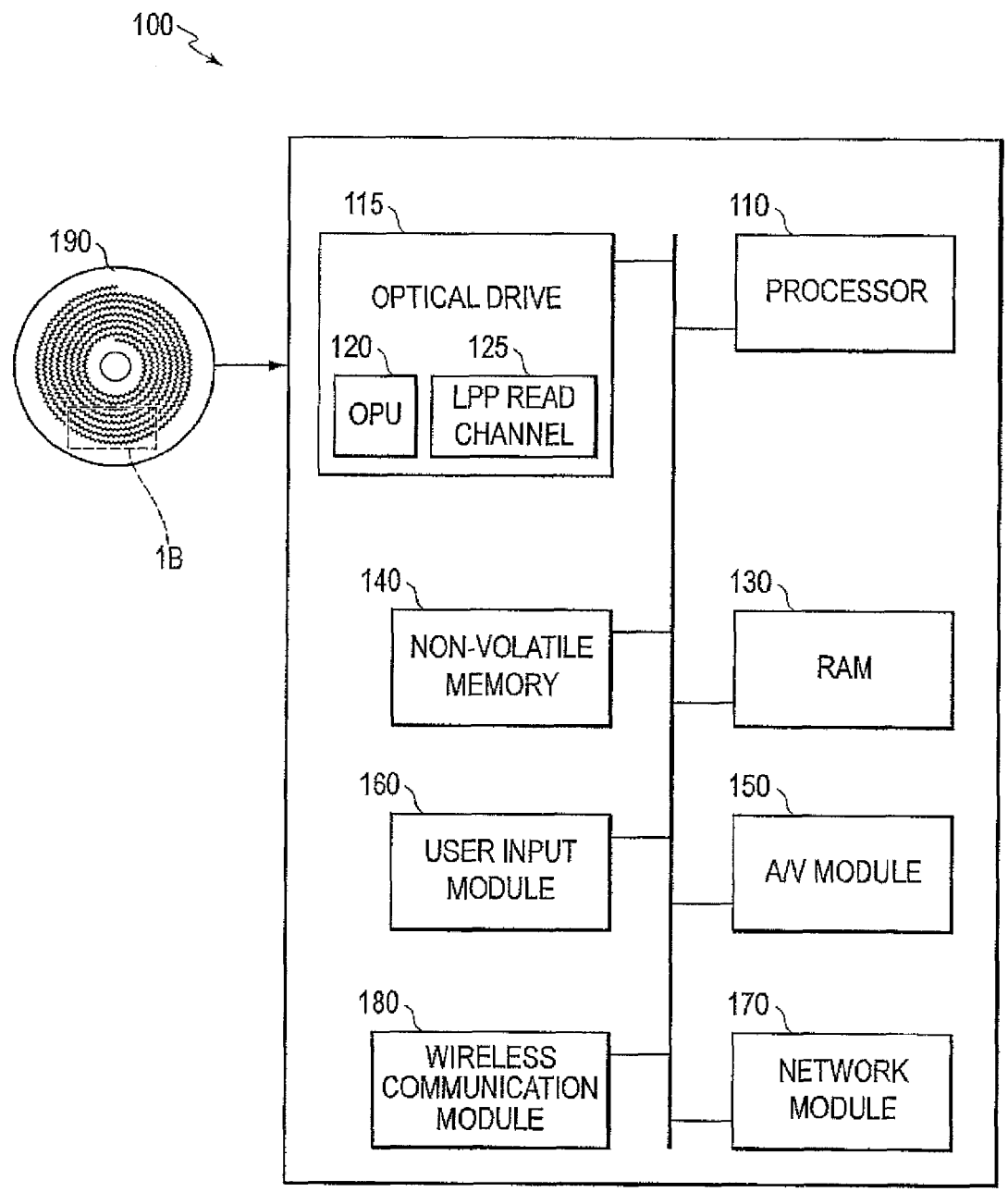
FIGS. 1A and 1B show a block diagram of an exemplary medium device and an exemplary memory medium.
Figure 1B:
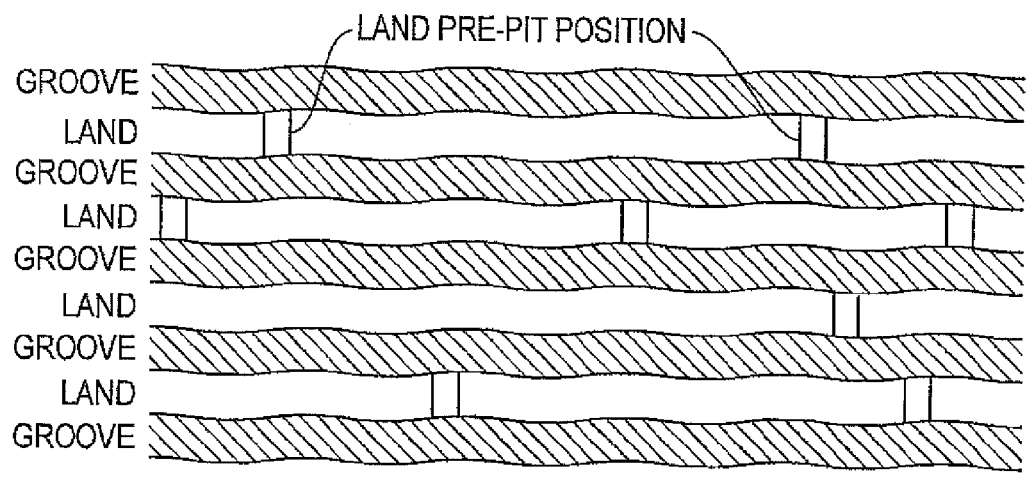

FIGS. 1A and 1B show a block diagram of an exemplary medium device with an exemplary memory medium. The medium device 100 can include a processor 110, an optical drive 115, a RAM unit 130, and a non-volatile memory 140. These elements can be coupled together as shown in FIG. 1A.

The optical drive 115 can further include an optical pickup unit (OPU) 120. The OPU 120 can receive signals corresponding to various information, such as timing information, address information, disc information, user data, and the like, in a memory medium, such as an optical disc 190. For example, the OPU 120 may direct a laser beam to a location of the optical disc 190. The laser beam can be reflected from the location of the optical disc 190. The reflected laser beam may have light properties that can correspond to information embedded at the location of the optical disc 190. The light properties can be detected by a light detector of the OPU 120. Further, the light detector of the OPU 120 may convert the light properties to electrical signals for other components of the optical drive 115 to extract the various information, for example.

In addition, the OPU 120 can be configured to record user data on the optical disc 190 according to the extracted information, such as timing information, address information, disc information, and the like. For example, the OPU 120 may direct a recording laser beam to a recording location of the optical disc 190. The recording laser beam may have a laser power determined according to the extracted disc information, and may have a turn-on time determined according to the extracted timing information. In addition, the recording location may be determined based on the extracted address information, for example.

According to the disclosure, the optical drive 115 may include a land pre-pit (LPP) read channel 125 that can be configured to detect land pre-pits from an electrical signal converted by the light detector in order to extract the embedded information. The land pre-pit read channel 125 can include an adaptive land pre-pit threshold. The adaptive land pre-pit threshold can be used to determine a status, such as a binary status, of the electrical signal to detect the land pre-pits.

As shown in FIG. 1A, the optical disc 190 can generally include a spiral recording track, for example in the form of a spiral groove adjacent to a spiral land. On the spiral recording track, user data can be stored on a recording layer by forming either data pits or data marks. The data pits or data marks can be preferred to have a substantially constant linear length to improve the data storage capability of the optical disc 190. To assist maintaining constant length of data marks or data pits, timing and address information can be encoded in the spiral groove and the spiral land during disc manufacturing. In an example, the timing information can be encoded by wobbling the spiral groove and the spiral land. Further, address information and disk information can be encoded via land pre-pits (LPP) for certain kinds of memory media, such as DVD-R, DVD-RAM and DVD-RW, and the like.

FIG. 1B shows an enlarged portion of an exemplary optical disc 190. The optical disc 190 can include alternatively arranged groove fields and land fields. The land fields can include land pre-pits. The land pre-pits can be produced by disc manufacturer. In an embodiment, the land pre-pits are embossed on the land fields during the manufacture of the disk substrate. It is noted that various techniques can be used to emboss the land pre-pits on the land fields. In an example, during disc manufacturing, the disc manufacturer can deposit little pieces of mirrors, such as aluminum, at specific locations of the land fields to form the land pre-pits.

The mirrors may have a higher reflectivity than areas without the land pre-pits. The higher reflectivity can be detected by the OPU 120. For example, the OPU 120 may direct a laser beam onto a location of the optical disc 190. The laser beam can be reflected by the location. The reflected laser beam may have light properties that can correspond to a reflectivity of the location. When the laser beam is reflected by a location with a deposited mirror, the reflected laser beam may have a higher light intensity, for example. Further, the light properties may be detected by a detector of the OPU 120. The detector may generate electrical signals corresponding to the light properties. For example, the detector can generate a push-pull signal from the detected light. The push-pull signal may have an amplitude spike corresponding to a location with a mirror.

Further, the push-pull signal can be compared to a land pre-pit threshold to determine a status, such as a binary status, at a location. For example, when an amplitude of the electrical signal corresponding to a location is larger than the land pre-pit threshold, an amplitude spike can be detected. Therefore, the location can be determined to have a mirror. Thus, the location can be determined storing binary one, for example.

Generally, a land pre-pit threshold can be determined by a calibration process, and may be used globally to detect the land pre-pits. However, the globally used land pre-pit threshold can result in land pre-pit reading errors due to various reasons, such as manufacturing variations, gain variations and baseline variations of the electrical signal, noises and interferences of adjacent groove fields, and the like. Further, the land pre-pit reading errors may result in poor recording qualities.

According to the disclosure, the medium device 100 can include an adaptive land pre-pit threshold. The adaptive land pre-pit threshold can be adjusted based on format information of the land pre-pits. The adaptive land pre-pit can be used to reduce land pre-pit reading errors to improve recording quality.

The processor 110 of the medium device 100 can execute system and application codes. The non-volatile memory 140 can hold information even when power is off. Therefore, the non-volatile memory 140 can be used to store system and application codes, such as firmware. The RAM unit 130 is readable and writable. Generally, the RAM unit 130 can have a fast access speed. It can be preferred that data and codes are stored in the RAM unit 130 during operation, such that the processor 110 can access the RAM unit 130 for the codes and data instead of the non-volatile memory 140.

It should be understood that the memory device 100 may include more than one processor 110. Further, the non-volatile memory 140 may include various non-volatile memory devices, such as battery backup RAM, read only memory (ROM), programmable ROM (PROM), flash PROM, electrical erasable PROM (EEPROM) magnetic storage, optical storage, and the like. Some non-volatile memory 140 can be updated, such as various types of PROM. The RAM unit 130 may also include various RAM devices, such as DRAM, SRAM and the like.

For the ease and clarity of description, the embodiments are presented with a bus type architecture, however, it should be understood that any other architectures can also be used to couple components inside memory device 100.

Additionally, the memory device 100 may include a user input module 160. The user input module 160 may enable the user to control operations of the memory device 100. The user input module 160 may include various user input devices, such as keyboard, mouse, touch screen, and the like. In addition, the user input module 160 may include interfaces that can enable external user input devices.

In an embodiment, the memory device 100 may include an audio/video module 150. The audio/video module 150 may include various audio and video devices, such as microphone, display screen, and the like. In addition, the audio/video module 150 may include interfaces that can enable external audio and video devices. The audio/video module 150 can be utilized to play audio data/video data that can be stored in the optical disc 190.

In another embodiment, the memory device 100 may include a network module 170. Furthermore, the memory device 100 may include a wireless communication module 180. The network module 170 and the wireless communication module 180 may enable the memory device 100 to communicate the data stored in the optical disc 190 to other devices.

Figure 2A:
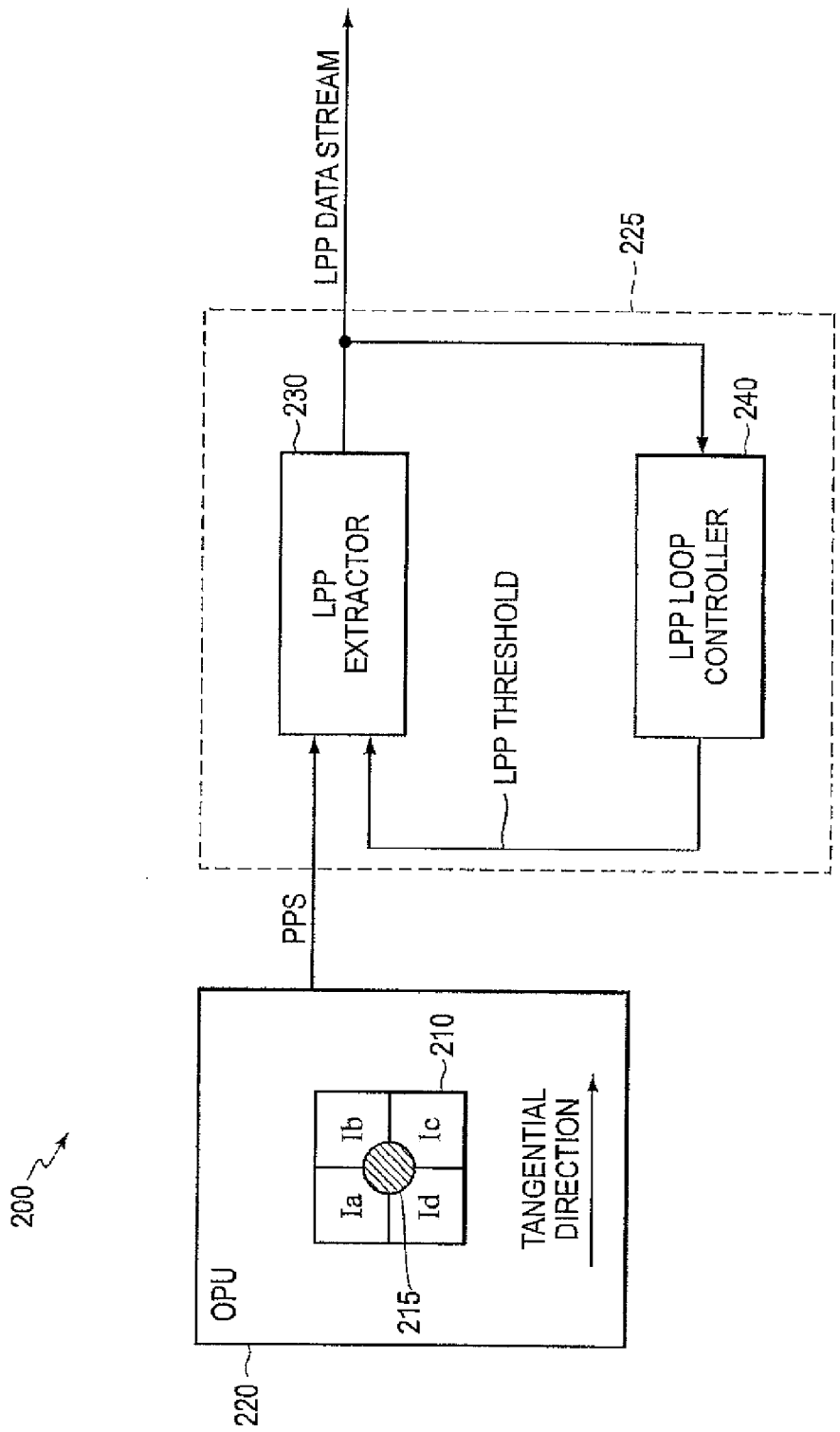
FIGS. 2A and 2B show a block diagram of an exemplary land pre-pit read channel coupled to an exemplary optical pick-up unit (OPU) and an exemplary pick-up signal.
Figure 2B:
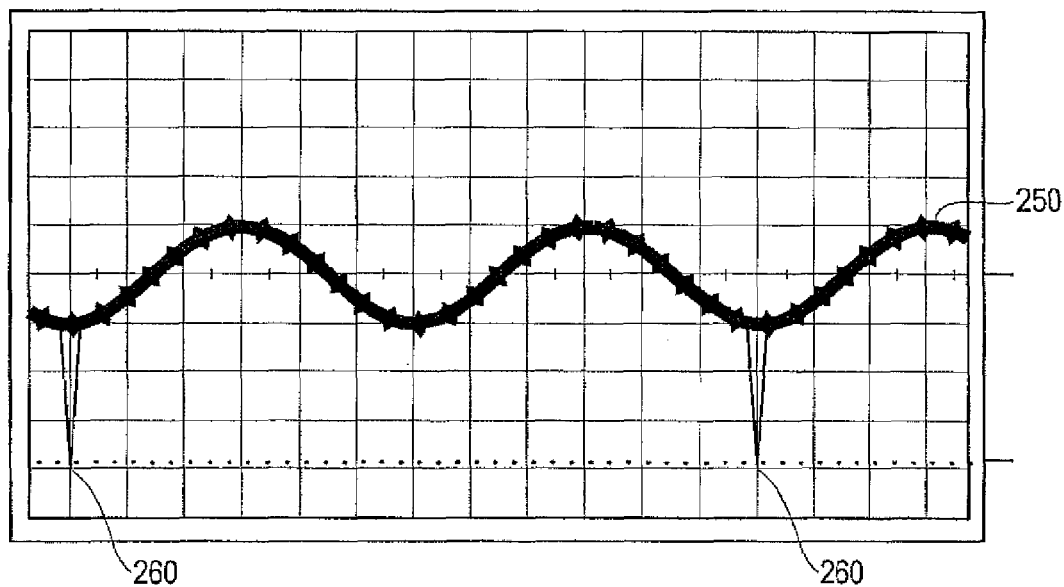

FIGS. 2A and 2B show a block diagram of an exemplary land pre-pit read channel receiving a push-pull signal and an exemplary waveform of a push-pull signal. FIG. 2A shows the block diagram of the exemplary land pre-pit read channel 225 coupled with an exemplary optical pickup unit 220. Further, the land pre-pit read channel 225 can include a land pre-pit extractor 230 and a land pre-pit loop controller 240. Theses elements can be coupled as shown in FIG. 2A.

The optical pickup unit 220 may include a detector, such as a quadrant photo detector 210 shown in FIG. 2A. The quadrant photo detector 210 may detect a light beam 215, and generate various signals, including a push-pull signal (PPS), corresponding to the light beam 215. The push-pull signal can correspond to wobbled groove and land fields on a memory medium. Further, the push-pull signal can correspond to land pre-pits in the land fields for certain memory medium, such as DVD-R, DVD-RAM and DVD-RW.

The land pre-pit extractor 230 can receive the push-pull signal. Further, the land pre-pit extractor 230 can compare the push-pull signal with an adaptive land pre-pit threshold to determine a land pre-pit data stream. In an embodiment, the land pre-pit extractor 230 may include an analog comparator (not shown). The analog comparator may compare the push-pull signal with the adaptive land pre-pit threshold to obtain a pulse signal. Further, the pulse signal can be converted to the land pre-pit data stream based on a clock signal, such as a wobble clock signal that can also be extracted from the push-pull signal.

The land pre-pit loop controller 240 can receive the extracted land pre-pit data stream and adjust the adaptive land pre-pit threshold based on the extracted land pre-pit data stream. Further, the adjusted adaptive land pre-pit threshold can be used by the land pre-pit extractor 230 to extract a subsequent land pre-pit data stream from a following portion of the push-pull signal. In such a way, the land pre-pit loop controller 240 can couple the land pre-pit extractor 230 to form a land pre-pit feedback loop.

According to the disclosure, land pre-pits are formed by disc manufacture according to a pre-known format, such as an industry standard. Therefore, the land pre-pit loop controller 240 may include the pre-known format information about the land pre-pits. The land pre-pit loop controller 240 may extract detected format from the land pre-pit data stream. Further, the land pre-pit loop controller 240 can compare the detected format with the pre-known format information, and adjust the adaptive land pre-pit threshold accordingly.

FIG. 2B shows an exemplary waveform of a push-pull signal. The push-pull signal 250 can have a sinusoid shape as a result of wobbled groove and land fields. Further, the push-pull signal 250 may include spikes 260 as a result of land pre-pits at specific locations of land fields. Due to various variations, noises and interferences, amplitudes of the spikes 260 may vary. Further, the amplitude variations of the spike 260 may result in detecting errors in the land pre-pit data stream.

FIG. 3 shows a block diagram of an exemplary land pre-pit loop controller according to disclosure. The land pre-pit loop controller 340 may include a comparator 310, a threshold adjuster 320 and a land pre-pit format retainer 330 holding pre-known land pre-pit format information. These elements can be coupled together as shown in FIG. 3.

The comparator 310 can receive a land pre-pit data stream and compare the land pre-pit data stream with the pre-known land pre-pit format information. Then, the comparator 310 can output an error signal corresponding to difference between the land pre-pit data stream and the pre-known land pre-pit format information. In an embodiment, the comparator 310 can be implemented as a software code module, which can be executed by a processor (not shown) to compare the land pre-pit data stream with the pre-known land pre-pit format information. In another embodiment, the comparator 310 can be implemented as a hardware module, such as application specific integrated circuit (ASIC), to perform the above functions.

The threshold adjuster 320 can receive the error signal and adjust the adaptive land pre-pit threshold based on the error signal. In an embodiment, the threshold adjuster 320 may adjust the adaptive land pre-pit threshold based on an average of the error signal. Additionally, the threshold adjuster 320 may include a programmable parameter, such as a programmable gain, which can be used to change properties of the land pre-pit feedback loop.

The land pre-pit format retainer 330 can include pre-known land pre-pit format information. In an embodiment, the land pre-pit format retainer 330 can be implemented in software codes that can be stored in a memory medium, such as the random access memory (RAM) 130, the non-volatile memory 140, and the like, to hold the pre-known land pre-pit format information. In another embodiment, the land pre-pit format retainer 330 can include memory devices, such as registers, to hold the pre-known land pre-pit format information.

Figure 4A:
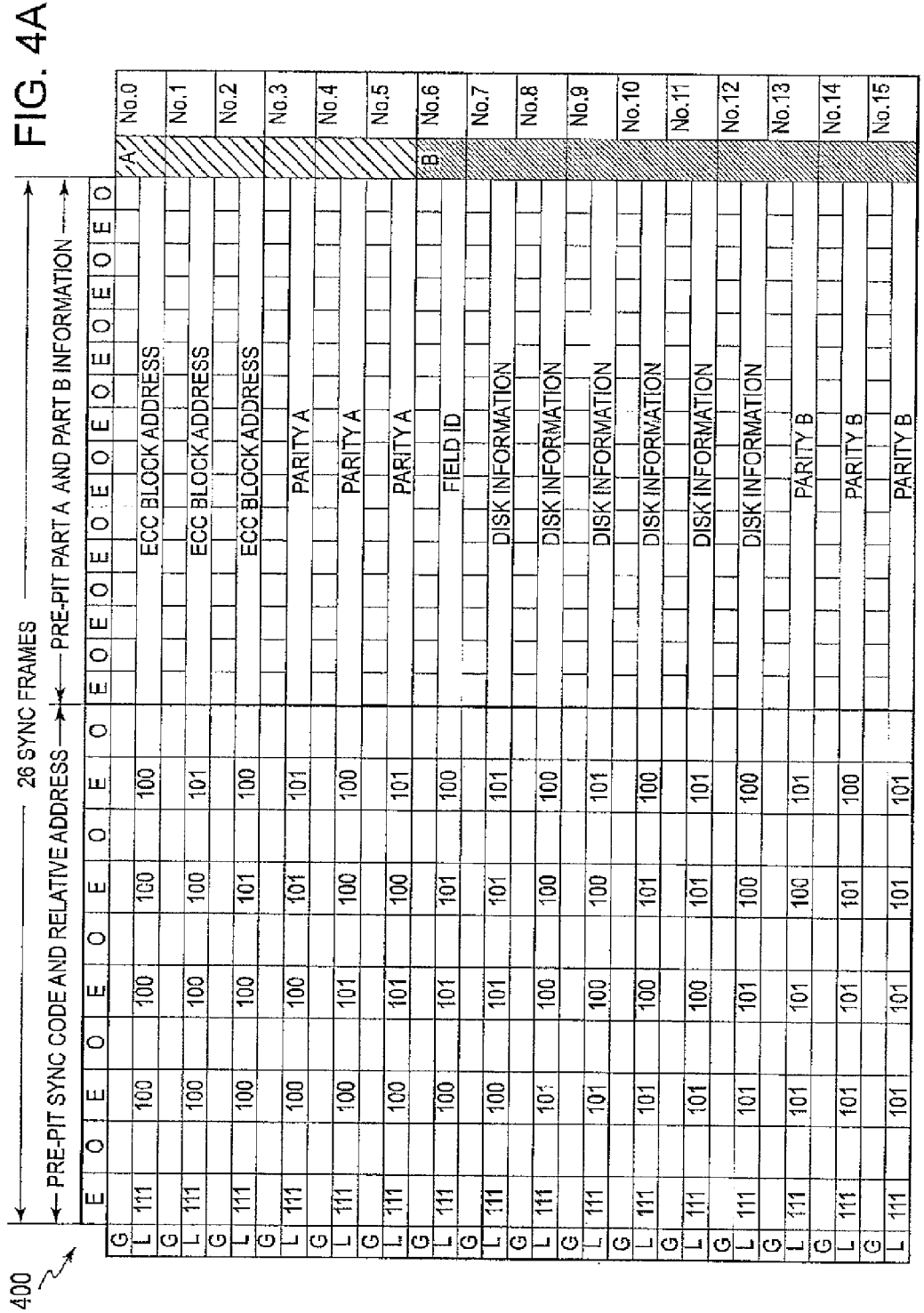

FIGS. 4A and 4B show tables of exemplary land pre-pit format information. FIG. 4A shows an exemplary pre-pit physical block format information according to a standard. The pre-pit physical block 400 can be encoded in the land fields, and can correspond to 16 sectors of data blocks, which are generally referred as ECC blocks, in the groove fields.

The pre-pit physical block 400 can include 16 sets pre-pits No. 0-No. 15. Each set of pre-pits can include 26 SYNC frames, which are assigned even (E) SYNC frames or odd (O) SYNC frames according to their sequences. Each SYNC frame may include 8 wobble periods, and each wobble period can be encoded a binary wobble bit depending on whether the wobble period includes a pre-pit. For example, a wobble period can be encoded with a binary wobble bit one if the wobble period includes a pre-pit, otherwise the wobble period can be encoded with a binary wobble bit zero.

The wobble bits can be used to encode address information and disc information according to certain format. In the example of FIG. 4A, every two SYNC frames can use the wobble bits to encode a code. The code can be encoded at either the even SYNC frame or at the odd SYNC frame. Further, the code can be a SYNC code or a binary bit code according to certain coding format.

FIG. 4B shows an exemplary coding format according to a standard. The coding format can use three wobble binary bits $b_2$-$b_0$ to encode the SYNC code and the binary bit code in every two SYNC frames. In the example of FIG. 4B, when the SYNC code is in even SYNC frame, the three wobble binary bits $b_2$-$b_0$ are 111; when the SYNC code is in odd SYNC frame, the three wobble binary bits $b_2$-$b_0$ are 110; when binary one is encoded, the three wobble binary bits $b_2$-$b_0$ are 101; and when binary zero is encoded, the three wobble binary bits $b_2$-$b_0$ are 100.

Accordingly, wobble bits information can be pre-known at certain locations. For example, two SYNC frames that encode a SYNC code can either be 1110000000000000 or 0000000011000000. In an embodiment, a comparator can generate an error signal based on the two SYNC frames that encode a SYNC code. The comparator may store detected wobble bits of two SYNC frames corresponding to a SYNC code in registers, which can be referred as rawLPP[0:15]. Further, the comparator can generate the error signal by comparing the detected wobble bits with the pre-known format information. For example, the comparator may assign −1 to the error signal when 0 is detected at a location that should be 1 according to the pre-known format, and may assign 1 to error signal when 1 is detected at a location that should be 0 according to the pre-known format.

In an embodiment, a comparator can be configured to generate an error signal according to following pseudo codes:

```
if rawLPP[0]|rawLPP[8]~=1
    error signal <=−1
end
if rawLPP[1] | rawLPP[9] | rawLPP[3:7] | rawLPP[11:15] ~=0
    error signal <=+1
end
```

According to the disclosure, the error signal can be used by the threshold adjuster 320 to adjust the adaptive pre-pit threshold to improve the pre-pit detecting correctness. In an embodiment, the threshold adjuster 320 can adjust the adaptive pre-pit threshold based on an average of the error signal.

Figure 5:
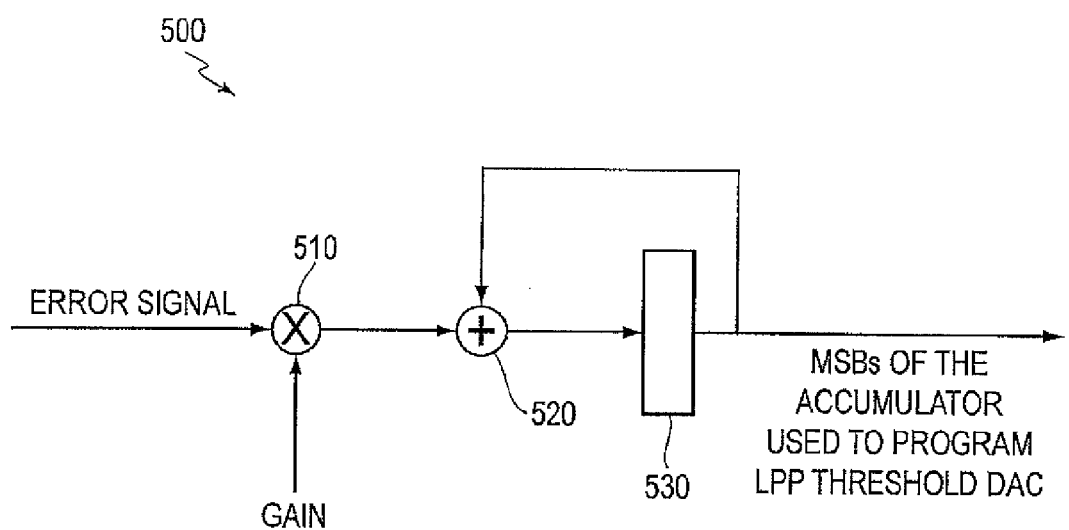
FIG. 5 shows a block diagram of an exemplary threshold adjuster.

FIG. 5 shows a block diagram of an exemplary integrator circuit that can be included in a threshold adjuster to generate a control signal based on an error signal. The integrator 500 can include a multiplier 510, an accumulator 520, and a register 530. These elements can be coupled as shown in FIG. 5.

The multiplier 510 can receive an error signal, and multiply the error signal with a programmable gain. The programmable gain can be used to adjust properties of the land pre-pit feedback loop.

The accumulator 520 and the register 530 can be coupled together to integrate the multiplied error signal to generate an integrated error signal. Further, the integrated error signal can be used to adjust the adaptive land pre-pit threshold.

In an embodiment, a most significant bit of the integrated error signal can be used to adjust a digital representation of the adaptive land pre-pit threshold. Further, the digital representation of the adaptive land pre-pit can be converted to an analog voltage signal by a digital to analog converter (DAC).

Figure 6A:
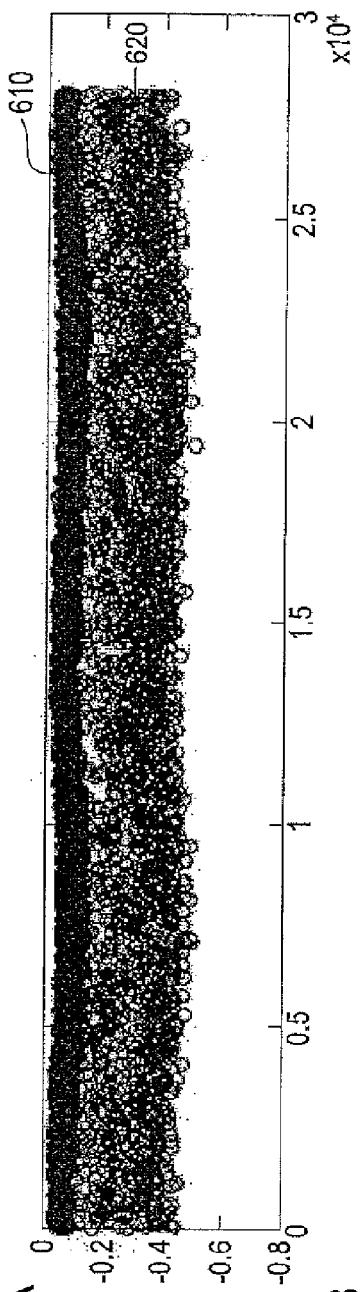
FIGS. 6A-6C show waveforms of an exemplary land pre-pit read channel.
Figure 6B:
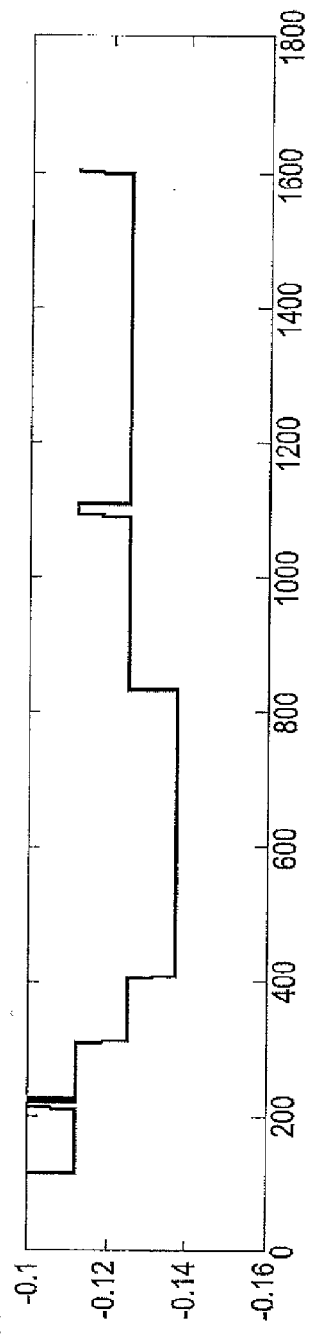
Figure 6C:
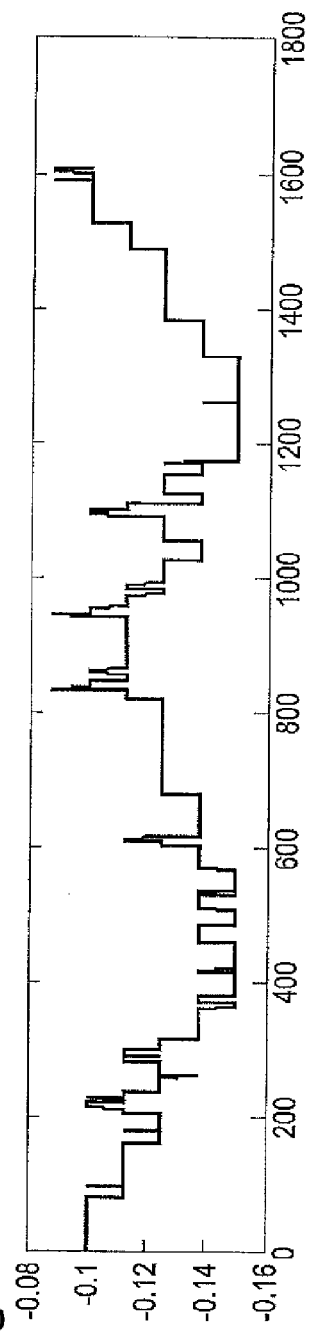

FIGS. 6A-6C show waveforms of an exemplary land pre-pit detector. FIG. 6A shows waveforms of an exemplary push-pull signal read from an optical medium. The waveforms can include two portions, a wobble baseline portion 610 and a spike portion 620. The spike portion can correspond to amplitude spikes that area result from land pre-pits. However, as can be seen, the wobble based line portion 610 and the spike portion 620 may not distinguishable by a single global threshold.

FIG. 6B and FIG. 6C show waveforms of exemplary adaptive land pre-pit threshold according to two feedback loop settings, respectively. In an embodiment, the two feedback loop settings can correspond to different values of a programmable gain of a feedback loop. For example, FIG. 6B can correspond to a feedback loop setting having a larger programmable gain, and FIG. 6C can correspond to a feedback loop setting having a smaller programmable gain. Accordingly, the adaptive land pre-pit threshold may have different properties. For example, the adaptive land pre-pit threshold waveform in FIG. 6B can have a smaller bandwidth, while the adaptive land pre-pit threshold waveform in FIG. 6C can have a larger bandwidth.

Figure 7:
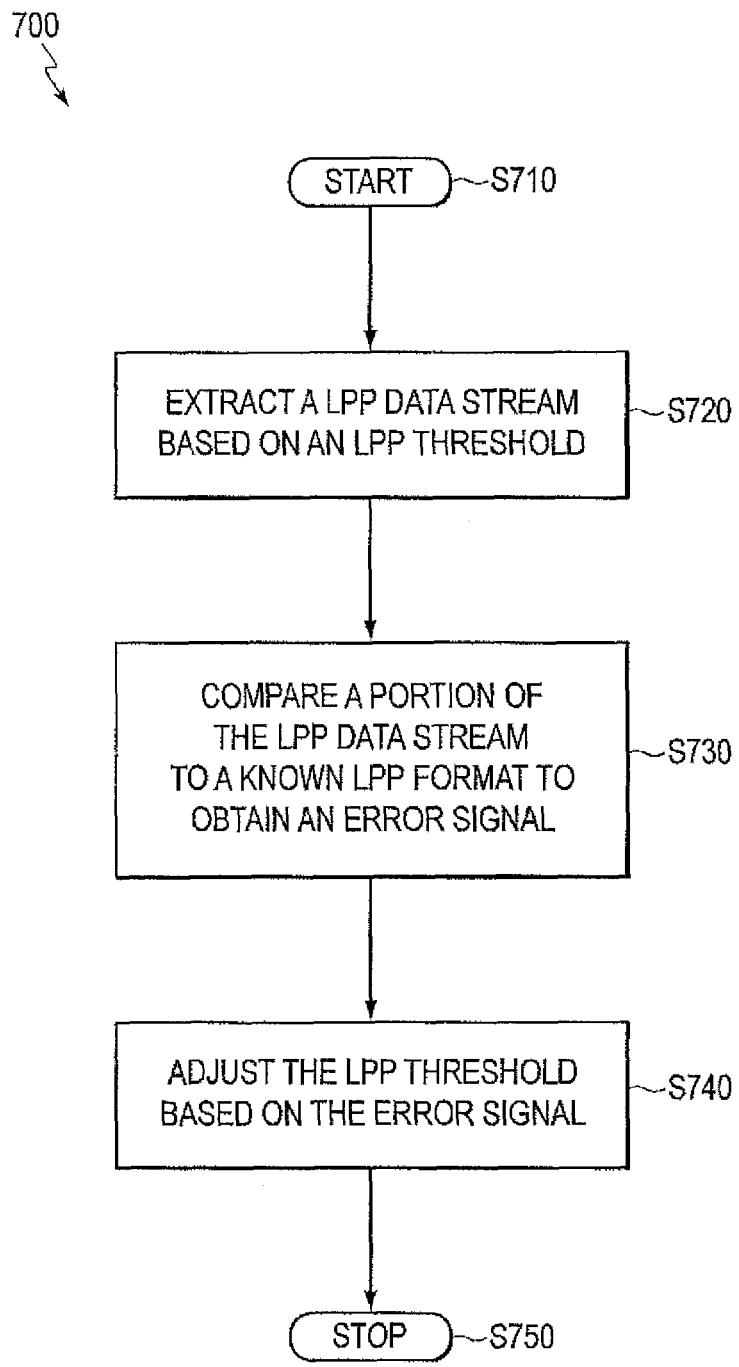
FIG. 7 shows a flowchart outlining an exemplary process for detecting land pre-pits.

FIG. 7 shows a flowchart outlining an exemplary process for detecting land pre-pit. The process starts at step S710 and proceeds to step S720. In step S720, a land pre-pit read channel, such as the land pre-pit read channel 225, may receive a push-pull signal. Further, the land pre-pit read channel may extract a land pre-pit data stream based on an adaptive pre-pit threshold. In an embodiment, the adaptive pre-pit threshold can be determined initially by a calibration process that calibrates parameters for a memory medium. The initial adaptive pre-pit threshold can be one that is good for a portion of the memory medium. In another embodiment, the initial adaptive pre-pit threshold can be a good nominal threshold that can be pre-programmed in the memory medium. Then, the process proceeds to step S730.

In step S730, a controller, such as the land pre-pit loop controller 240, may compare a portion of the land pre-pit data stream with a pre-known format to obtain an error signal. In an embodiment, the controller may first detect a SYNC code. Once the SYNC code has been detected and verified, the controller can compare the land pre-pit stream with the known format accordingly. For example, SYNC codes can appear every 26 SYNC frames according to a standard. Further, each SYNC code can have a format of 1110000000000000 or a format of 000000001100000. In an embodiment, the controller may generate −1 for missing a pre-pit at a location, and generate +1 for an unexpected pre-pit at a location. Then the process proceeds to step S740.

In step S740, the controller may adjust the adaptive land pre-pit threshold based on the error signal. In an example, the controller may adjust the adaptive land pre-pit threshold based on an average of the error signal. Then, the adjusted adaptive land pre-pit threshold can be used to extract land pre-pits from coming push-pull signal. The process then proceeds to step S750 and terminates.

According to an aspect of the disclosure, the land pre-pit threshold can be adaptively adjusted without land pre-pit SYNC codes detection. In an embodiment, the land pre-pit read channel 225 is configured to have a first adaptation mode in which the land pre-pit read channel 225 adaptively adjusts the land pre-pit threshold prior to sync window lock, and a second adaptation mode in which the land pre-pit read channel 225 adaptively adjusts the land pre-pit threshold after sync window lock.

Figure 8:
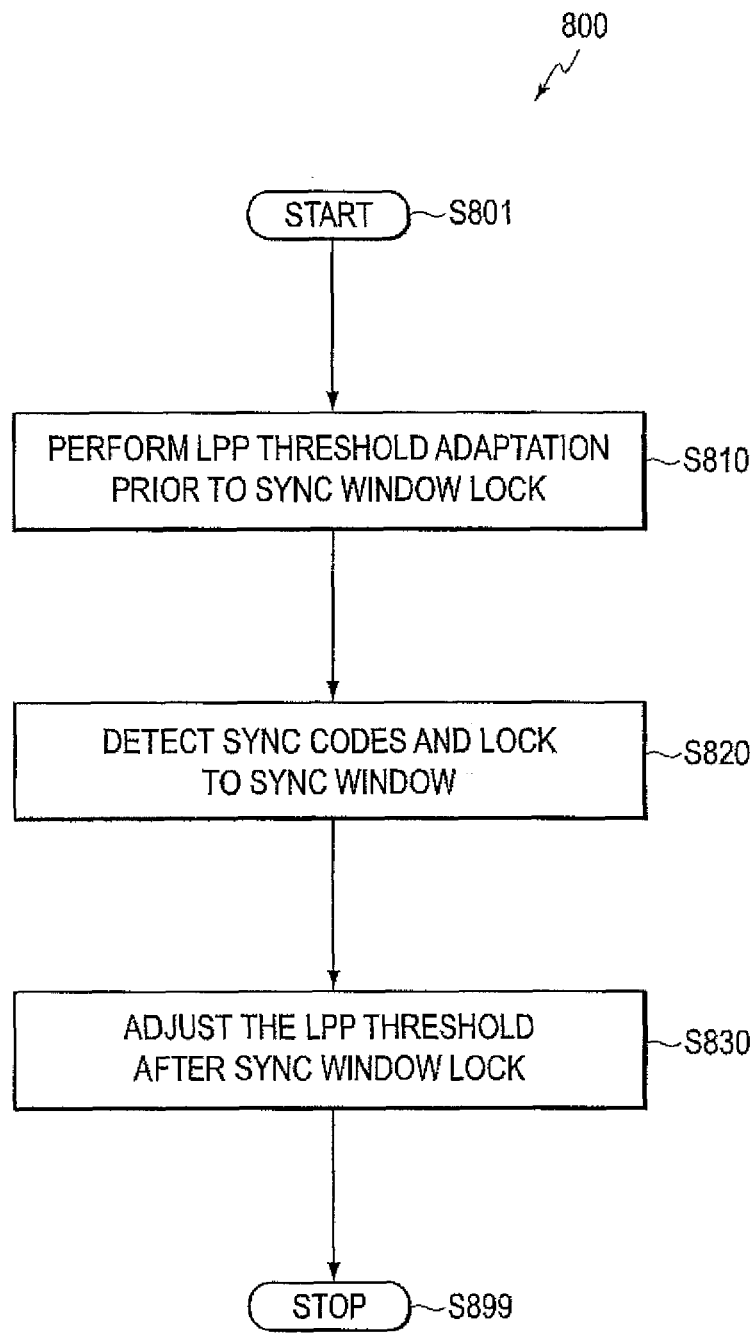
FIG. 8 shows a flowchart outlining a process example 800 for detecting land pre-pits according to an embodiment of the disclosure.

FIG. 8 shows a flowchart outlining a process example 800 that can be performed by the land pre-pit read channel 225 according to an embodiment of the disclosure. The process starts at S801 and proceeds to S810.

At S810, the land pre-pit read channel 225 is configured into the first adaptation mode for land pre-pit detection prior to sync window lock. In the first adaptation mode, the land pre-pit extractor 230 compares the push-pull signal with an adaptively adjusted land pre-pit threshold to detect the land pre-pit data stream. The land pre-pit threshold is adaptively adjusted by the land pre-pit loop controller 240 without the requirement of land pre-pit SYNC code detection. Specifically, in an example, the land pre-pit loop controller 240 receives the land pre-pit data stream, detects a characteristic, such as a statistical characteristic, of land pre-pits in a specific number of wobble periods, such as a multiple of sixteen wobble periods, and the like. Further, the land pre-pit loop controller 240 compares the detected characteristic with a pre-determined land pre-pit characteristic in the specific number of wobble periods, and then adjusts the land pre-pit threshold based on the comparison.

In an embodiment, when a wobble period includes a land pre-pit, the wobble period is encoded with a wobble binary bit of "1," and when a wobble period does not include a land pre-pit, the wobble period is encoded with a wobble binary bit of "0." Further, the wobble binary bits in every two SYNC frames are used to encode a code, such as a land pre-pit SYNC code, a binary one code, or a binary zero code. According to an embodiment of the disclosure, a statistical characteristic of land pre-pits can be determined for a specific number of wobble periods. In an example, according to the coding format in FIG. 4B, generally, every sixteen wobble periods include at least one land pre-pit, and at most three land pre-pits. In another example, every thirty-two wobble periods include at least two land pre-pits, and at most six land pre-pits.

In an example, the land pre-pit loop controller 240 counts a number of land pre-pits in every sixteen wobble periods, when the number is larger than three or smaller than one, the land pre-pit loop controller 240 suitably adjusts the land pre-pit threshold, and provides the adjusted land pre-pit threshold to the land pre-pit extractor 230.

At S820, the land pre-pit read channel 225 detects SYNC codes, and locks the land pre-pit data stream to sync window.

At S830, the land pre-pit read channel 225 is configured into the second adaptation mode for land pre-pit detection after sync window lock. When the land pre-pit data stream is locked to the sync window, the land pre-pit loop controller 240 has the format information of wobble binary bits at specific positions in the sync window. Thus, in the second adaptation mode, in an example, the land pre-pit loop controller 240 compares the detected land pre-pit data stream at the specific positions with the pre-known wobble binary bits at the specific positions, and adaptively adjusts the land pre-pit threshold based on the comparison. Then, the process proceeds to S899 and terminates.

Figure 9:
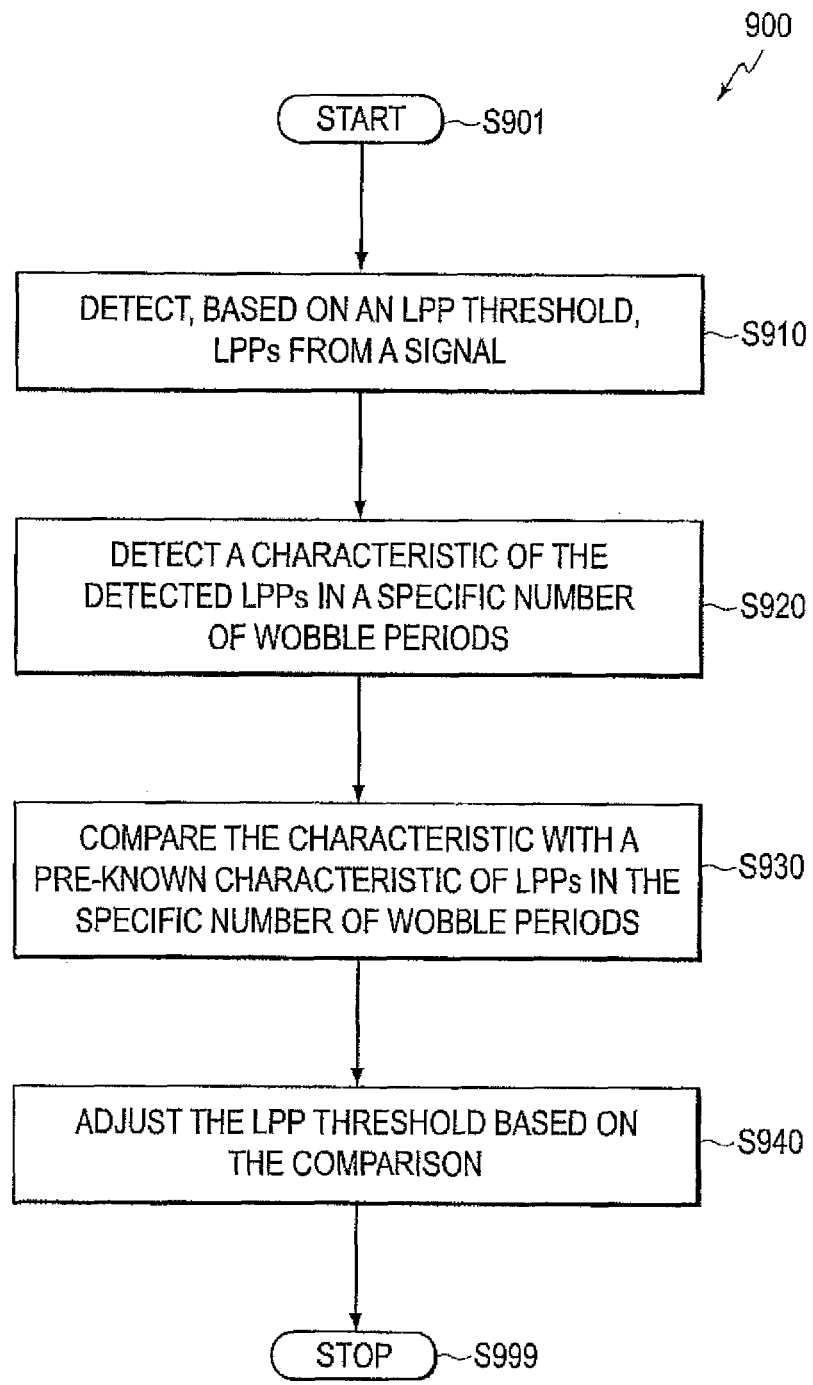
FIG. 9 shows a flowchart outlining a process example 900 for detecting land pre-pits according to an embodiment of the disclosure.

FIG. 9 shows a flowchart outlining a process example 900 for adaptively adjusting the land pre-pit threshold when the land pre-pit read channel 225 is configured in the first adaptation mode according to an embodiment of the disclosure. In an example, the land pre-pit read channel 225 performs the process 900 in the step S810 of the process 800. The process starts at S901 and proceeds to S910.

At S910, the land pre-pit extractor 230 detects, based on a land pre-pit threshold, land pre-pits from a signal, such as a push-pull signal generated in responsive to a track on an optical medium.

At S920, the land pre-pit loop controller 240 detects a characteristic, such as a statistical characteristic of the land pre-pits in a specific number of wobble periods, such as a multiple of sixteen wobble periods, and the like. In an example, the land pre-pit loop controller 240 counts a total number of detected land pre-pits in the specific wobble periods.

At S930, the land pre-pit loop controller 240 compares the detected characteristic with a pre-known characteristic of the land pre-pits in the specific number of wobble periods. In an example, the land pre-pit loop controller 240 compares the total number of detected land pre-pits to an upper limit value of land pre-pits in the specific number of wobble periods, and a lower limit value of land pre-pits in the specific number of wobble periods. In an embodiment, the land pre-pit loop controller 240 generates an error signal based on the comparison.

At S940, the land pre-pit loop controller 240 adjusts the land pre-pit threshold based on the comparison. In an example, the land pre-pit loop controller 240 adjusts the land pre-pit threshold based on the error signal generated in S930. It is noted that the land pre-pit loop controller 240 can use any suitable technique to adjust the land pre-pit threshold based on the error signal. In an example, the land pre-pit loop controller 240 can use a uniform step adjustment technique. In another example, the land pre-pit loop controller 240 can adjust the land pre-pit threshold using non-uniform step adjustment. Further, the land pre-pit extractor 230 uses the adjusted land pre-pit threshold to detect land pre-pits from subsequent push-pull signal. The process then proceeds to S999 and terminates.

It is noted that, in an embodiment, the land pre-pit read channel 225 is implemented using circuits. Thus, the steps in the process 900 can be executed by different portions of the circuits at the same time.

FIG. 10 shows a table 1000 of wobble binary bits in sixteen wobble periods according to the coding format in FIG. 4B. According to an optical medium standard, eight wobble periods form a sync frame. Sync frames are sequentially numbered, thus sixteen consecutive wobble periods can include an even-number frame and an odd-number frame. When a wobble period includes a land pre-pit, the wobble period is encoded with a wobble binary bit of "1," and when a wobble period does not include a land pre-pit, the wobble period is encoded with a wobble binary bit of "0." Further, the wobble binary bits in every two frames are used to encode a code, such as a land pre-pit SYNC code, a binary one code, or a binary zero code. The code can be encoded at an even position (even-number frame) in the two frames or an odd position (odd-number frame) in the two frames.

The table 1000 shows sixteen wobble binary bits for encoding SYNC code at even position (EVEN SYNC), sixteen wobble binary bits for encoding SYNC code at odd position (ODD SYNC), sixteen wobble binary bits for encoding binary one code at even position (EVEN ONE), sixteen wobble binary bits for encoding binary one at odd position (ODD ONE), sixteen wobble binary bits for encoding binary zero code at even position (EVEN ZERO), and sixteen wobble binary bits for encoding binary zero at odd position (ODD ZERO).

Generally, the code is encoded at the even position. Occasionally, when there is a land pre-pit on the neighboring land, the position of the land pre-pits are shifted to the odd position. Thus, in an embodiment, generally, every sixteen wobble periods include at least one land pre-pit and at most three land pre-pits, as shown by the EVEN SYNC, EVEN ONE, and EVEN ZERO. In another embodiment, a multiple of sixteen wobble periods can be used to compensate for the shift to the odd position.

Figure 11:
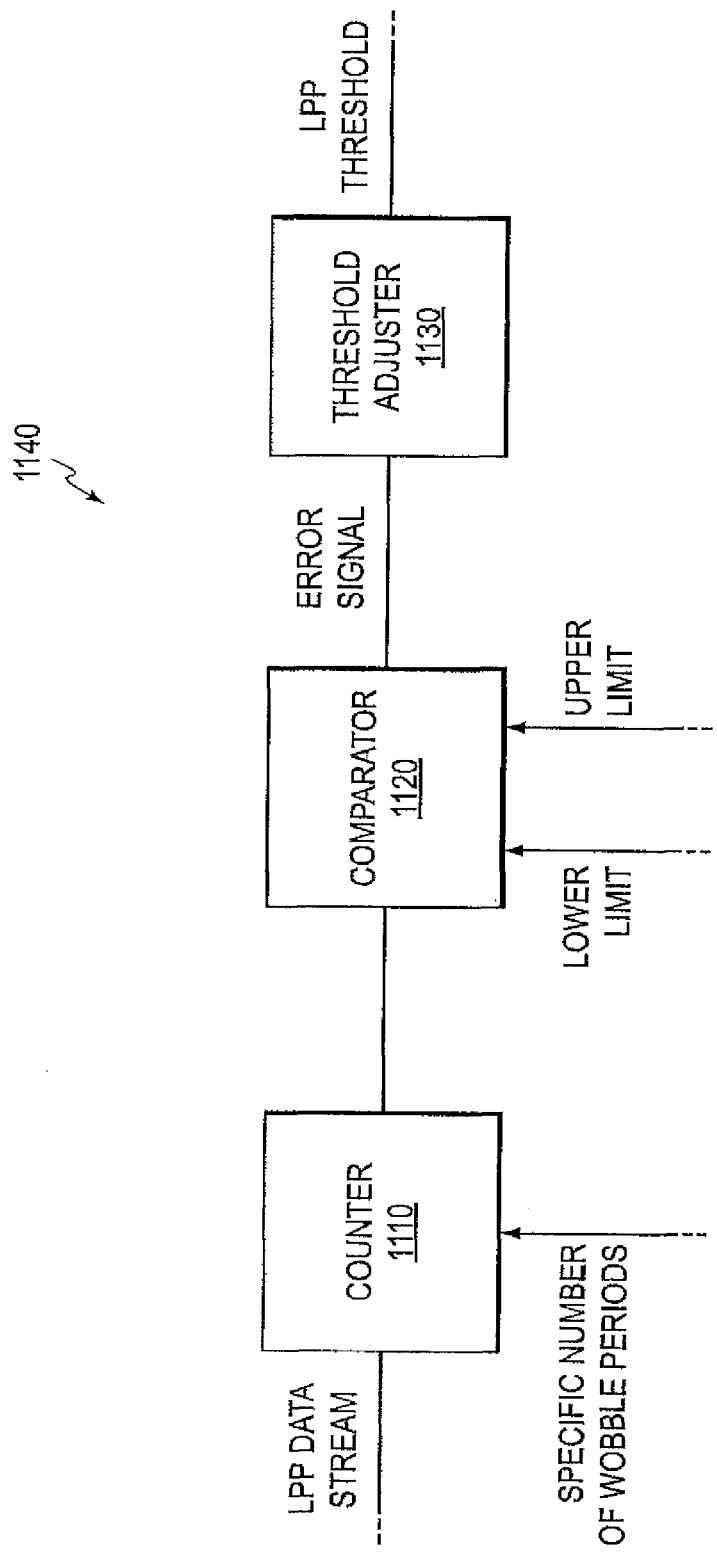
FIG. 11 shows a block diagram of circuits 1140 for adaptive land pre-pit threshold adjustment according to an embodiment of the disclosure.

FIG. 11 shows a block diagram of circuits 1140 for adaptive land pre-pit threshold adjustment according to an embodiment of the disclosure. The circuits 1140 can be included in the land pre-pit loop controller 240. The circuits 1140 can be combined with other circuits in the land pre-pit loop controller 240 or can be separately implemented as a module. In an example, the circuits 1140 are activated when the land pre-pit loop controller 240 is configured in the first adaptation mode, and are de-activated when the land pre-pit loop controller 240 is configured in the second adaption mode.

The circuits 1140 include a counter 1110, a comparator 1120 and a threshold adjuster 1130. These elements are coupled together as shown in FIG. 11.

The counter 1110 is configured to receive the land pre-pit data stream, and count a total number of land pre-pits in a specific number of wobble periods, such as sixteen wobble periods, and the like. The comparator 1120 compares the counted number of land pre-pits in the specific number of wobble periods with an upper limit and a lower limit, and generates an error signal based on the comparison. In an embodiment, the comparator 1120 is configured to generate the error signal according to the following pseudo codes:

```
if N==0
        error signal =−1
elseif N>3
        error signal =+1
else
        error signal =0
end
``` where N is the counted number of land pre-pits in the sixteen wobble periods.

The threshold adjuster 1130 receives the error signal and adjusts the land pre-pits threshold according to the error signal. In an embodiment, the threshold adjuster 1130 is similarly configured as the threshold adjuster 320. In an example, the threshold adjuster 1130 includes the integrator circuit 500. The description of these components has been provided above and will be omitted here for clarity purposes.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   detecting, based on a land pre-pit threshold, a land pre-pit data stream from a signal responsive to land pre-pits on an optical medium;
   comparing a pattern of the detected land pre-pit data stream in a specific number of wobble periods with pre-known patterns in the specific number of wobble periods; and
   adjusting the land pre-pit threshold based on the comparison.

2. The method of claim 1, wherein comparing the pattern of the detected land pre-pit data stream in the specific number of wobble periods with the pre-known patterns in the specific number of wobble periods further comprises:
   comparing the pattern of the detected land pre-pit data stream in a multiple of sixteen wobble periods with the pre-known patterns in the multiple of sixteen wobble periods.

3. The method of claim 1, wherein comparing the pattern of the detected land pre-pit data stream in the specific number of wobble periods with the pre-known patterns in the specific number of wobble periods further comprises:
   detecting the pattern of the detected land pre-pit data stream in the specific number of wobble periods prior to detecting a sync code from the land pre-pit data stream.

4. The method of claim 1, wherein comparing the pattern of the detected land pre-pit data stream in the specific number of wobble periods with the pre-known patterns in the specific number of wobble periods further comprises:
   counting a number of detected land pre-pits in the specific number of wobble periods.

5. The method of claim 4, further comprising at least one of:
   comparing the number of detected land pre-pits in the specific number of wobble periods with an upper limit of land pre-pits in the specific number of wobble periods; and
   comparing the number of land pre-pits with a lower limit of land pre-pits in the specific number of wobble periods.

6. The method of claim 5, wherein adjusting the land pre-pit threshold based on the comparison further comprises:
   adjusting the land pre-pit threshold in a direction to increase the number of detected land pre-pits when the number is below the lower limit; and
   adjusting the land pre-pit threshold in a direction to decrease the number of detected land pre-pits when the number is above the upper limit.

7. The method according to claim 1, wherein detecting, based on the land pre-pit threshold, the land pre-pit data stream from the signal corresponding to land pre-pits on an optical medium further comprises:
   detecting, based on the land pre-pit threshold, the land pre-pit data stream from a push-pull signal generated in response to reading at least one of a DVD-R disc, a DVD-RAM disc and a DVD-RW disc.

8. An apparatus, comprising:
   a detector configured to detect, based on a land pre-pit threshold, land pre-pit data stream from a signal responsive to land pre-pits on an optical medium; and
   a controller configured to compare a pattern of the detected land pre-pit data stream in a specific number of wobble periods with pre-known patterns in the specific number of wobble periods, and adjust the land pre-pit threshold based on the comparison.

9. The apparatus of claim 8, wherein the controller is configured to compare the pattern of the detected land pre-pit data stream in a multiple of sixteen wobble periods with the pre-known patterns in the multiple of sixteen wobble periods.

10. The apparatus of claim 8, wherein the controller is configured to detect the pattern of the detected land pre-pit data stream in the specific number of wobble periods prior to detecting a sync code from the land pre-pit data stream.

11. The apparatus of claim 8, wherein the controller comprises:
    a counter configured to count a number of detected land pre-pits in the specific number of wobble periods.

12. The apparatus of claim 11, wherein the controller further comprises:
    a comparator configured to compare the number of detected land pre-pits in the specific number of wobble periods with an upper limit of land pre-pits in the specific number of wobble periods and compare the number of land pre-pits with a lower limit of land pre-pits in the specific number of wobble periods.

13. The apparatus of claim 12, wherein the controller further comprises:
    threshold adjuster configured to adjust the land pre-pit threshold in a direction to increase the number of detected land pre-pits when the number is below the lower limit, and adjust the land pre-pit threshold in a direction to decrease the number of detected land pre-pits when the number is above the upper limit.

14. The apparatus of claim 8, wherein the detector is configured detect, based on the land pre-pit threshold, the land pre-pit data stream from a push-pull signal generated in response to reading at least one of a DVD-R disc, a DVD-RAM disc and a DVD-RW disc.

15. An optical drive, comprising:
an optical pickup unit configured to generate a signal in response to a track on an optical medium;
a detector configured to detect, based on a land pre-pit threshold, land pre-pit data stream from the signal; and
a controller configured to compare a pattern of the detected land pre-pit data stream in a specific number of wobble periods with pre-known patterns in the specific number of wobble periods, and adjust the land pre-pit threshold based on the comparison.

16. The optical drive of claim 15, wherein the controller is configured to compare the pattern of the detected land pre-pit data stream in a multiple of sixteen wobble periods with the pre-known patterns in the multiple of sixteen wobble periods.

17. The optical drive of claim 15, wherein the controller is configured to detect the pattern of the detected land pre-pit data stream in the specific number of wobble periods prior to detecting a sync code from the land pre-pit data stream.

18. The optical drive of claim 15, wherein the controller comprises:
a counter configured to count a number of detected land pre-pits in the specific number of wobble periods.

19. The optical drive of claim 18, wherein the controller further comprises:
a comparator configured to compare the number of detected land pre-pits in the specific number of wobble periods with an upper limit of land pre-pits in the specific number of wobble periods and compare the number of land pre-pits with a lower limit of land pre-pits in the specific number of wobble periods.

20. The optical drive of claim 19, wherein the controller further comprises:
threshold adjuster configured to adjust the land pre-pit threshold in a direction to increase the number of detected land pre-pits when the number is below the lower limit, and adjust the land pre-pit threshold in a direction to decrease the number of detected land pre-pits when the number is above the upper limit.

* * * * *